United States Patent [19]

Hosaka et al.

[11] Patent Number: 4,572,868

[45] Date of Patent: Feb. 25, 1986

[54] ANTI-CORROSIVE SEALING TAPE

[75] Inventors: Nobuyoshi Hosaka, Minori; Tasuku Shimizu, Hitachi, both of Japan

[73] Assignee: Hitachi, Ltd., Tokyo, Japan

[21] Appl. No.: 600,963

[22] Filed: Apr. 16, 1984

[30] Foreign Application Priority Data

Apr. 15, 1983 [JP] Japan .................................. 58-65367

[51] Int. Cl.⁴ ................................................ B32B 5/16
[52] U.S. Cl. .................................... 428/328; 428/334;
428/335; 428/355; 428/421; 428/425.6;
428/433; 428/443; 428/446; 428/451; 428/471;
428/480; 428/493; 428/494; 428/521; 428/523;
428/524; 428/906; 428/926; 525/433
[58] Field of Search ............... 428/355, 328, 480, 521,
428/524, 471, 443, 451, 446, 421, 425.6, 494,
493, 523, 926, 906, 335, 334; 524/433

[56] References Cited

U.S. PATENT DOCUMENTS 4,433,093  2/1984  Shida et al. .......................... 428/471

FOREIGN PATENT DOCUMENTS 1532294  11/1978  United Kingdom .

Primary Examiner—Edith Buffalow
Attorney, Agent, or Firm—Antonelli, Terry & Wands

[57] ABSTRACT

An anti-corrosive sealing tape comprising a first layer which exhibits conductivity and is prepared by adding fine zinc powder, magnesium oxide and graphite powder to a rubber base; e.g., a butyl rubber containing curing agents and a second layer which plays a role of reinforcing the first layer with imparting waterproofing or thermal insulating properties thereto. This tape will protect metal pipes or structural members against corrosion when wrapped around them.

5 Claims, 5 Drawing Figures

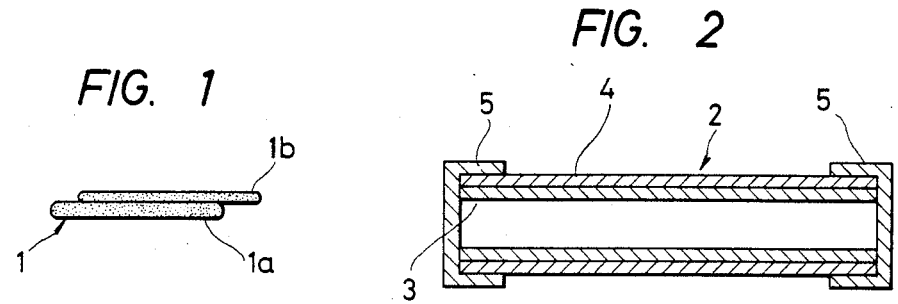
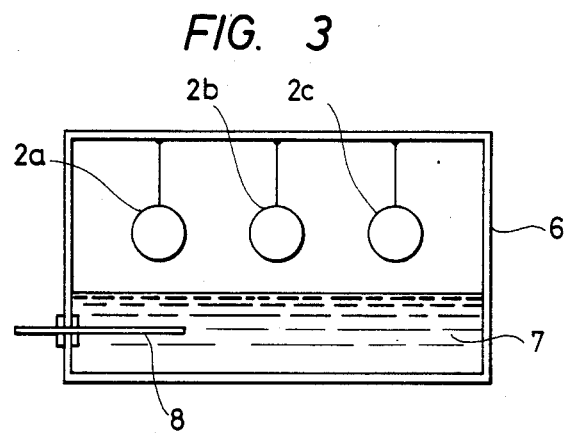
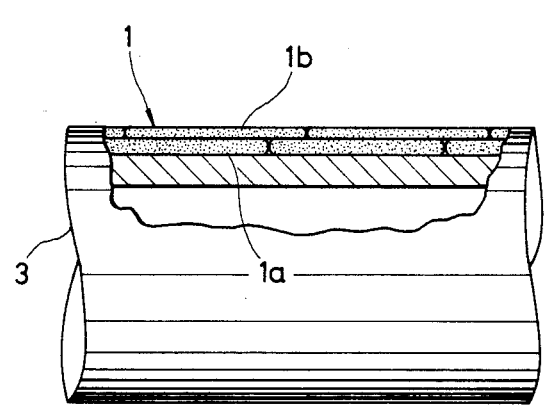

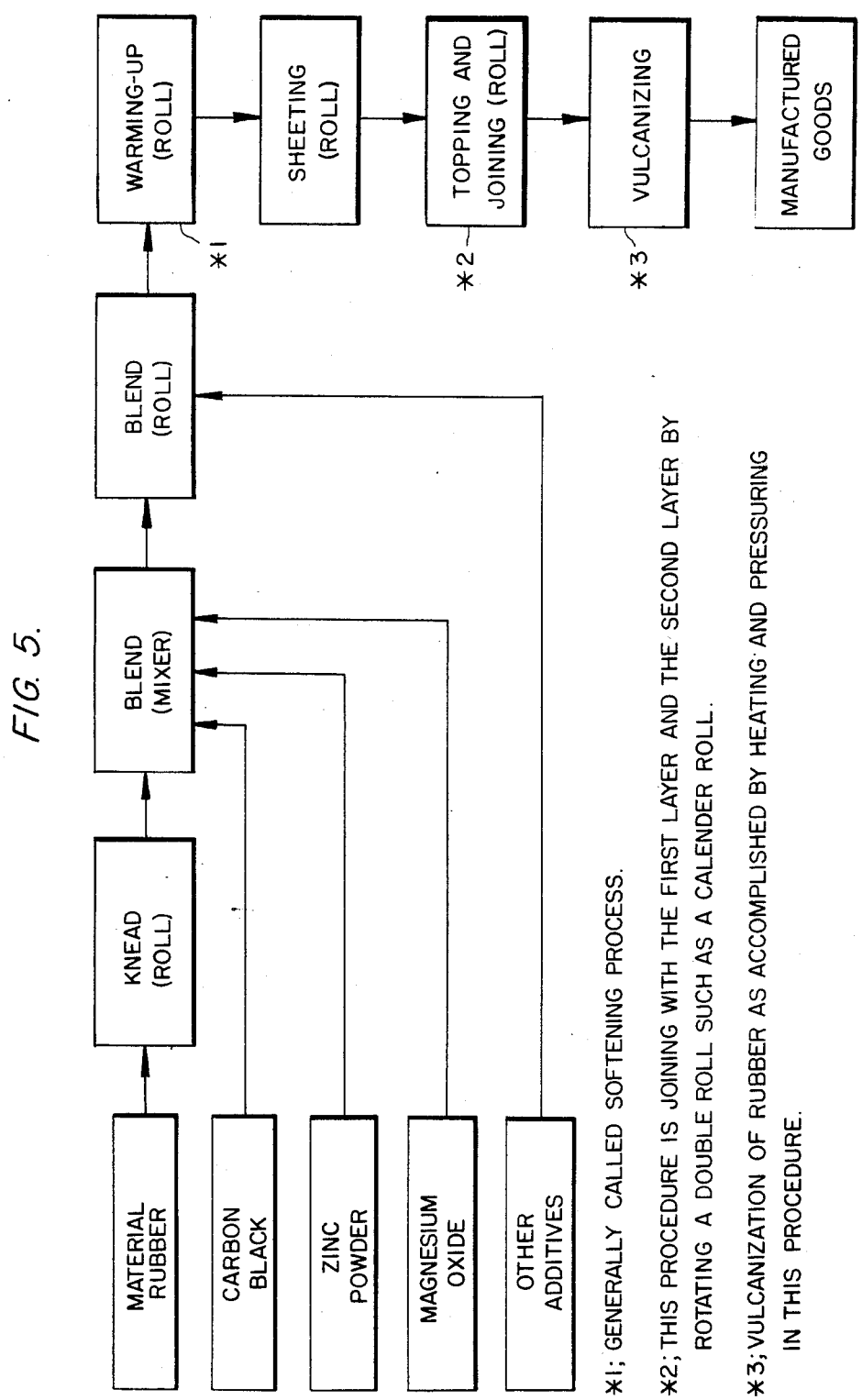

ANTI-CORROSIVE SEALING TAPE

BACKGROUND OF THE INVENTION

1. Field of the Invention

This invention relates to an anti-corrosive sealing tape which can protect structural members such as underground water pipes, gas pipes or chemical plant pipes against corrosion when wrapped around them.

2. Description of the Prior Art

Coating or resin lining has been previously used to protect structural members such as metal pipes against corrosion. However, these methods do not have corrosion preventive functions and exhibit a short life duration because of the presence of water infiltrating through a void formed by spontaneous expansion of film, an interface between a resin and a reinforcing agent or vehicle, a foam or the like.

Alternatively, anti-corrosive sealing tapes have also been used. A well-known example of an anti-corrosive sealing tape, which is prepared by extruding an adhesive composition containing a rubber base, graphite powder, silica, zinc oxide powder, a non-reactive phenolic condensate and other additives such as oil on a tape, has been disclosed in British Pat. No. 1,532,294. The function of this adhesive is to insulate a member wrapped therewith against its environment with a higher adhesiveness than that of a conventional coating or resin lining. That is to say, the aforementioned adhesive does not contain any ingredient which exhibits an active anoding effect by itself, such as zinc.

OBJECT OF THE INVENTION

In view of the foregoing, it is an object of the invention to provide an anti-corrosive sealing tape which exhibits an excellent, long-term anticorrosive effect.

SUMMARY OF THE INVENTION

In order to achieve the aforementioned object, this invention provides an anti-corrosive sealing tape which comprises a first layer exhibiting electrical conductivity that is prepared by adding fine zinc powder, magnesium oxide and graphite powder to a rubber base and a second layer composed of material which plays a role of reinforcing the first layer with imparting waterproofing or thermal insulating properties, wherein the second layer comprises a single layer of a synthetic resin or rubber or a composite layer of such a single layer with a fibrous material. Preferably, the anti-corrosive sealing tape of the invention comprises the conductive first layer which is made up of a rubber base, 5 to 350% (by weight based on the rubber base, the same applies hereinafter with respect to the other components) of fine zinc powder, 2 to 10% of magnesium oxide and 20 to 200% of graphite powder having a surface area of 900 to 1100 m²/gr and the second layer which is as heretofore described.

BRIEF DESCRIPTION OF THE DRAWINGS

FIG. 1 is a cross-sectional view of the anti-corrosive sealing tape of the invention;

FIG. 2 is a cross-sectional view of a test piece of a pipe coated externally with the anti-corrosive sealing tape of the invention;

FIG. 3 is a cross-sectional view of an experimental apparatus used for a corrosion test of the test piece.

FIG. 4 shows the arrangement of the anti-corrosive tape applied to the test piece; and FIG. 5 is a schematic diagram showing the procedure for blending of the rubber base.

DETAILED DESCRIPTION OF THE INVENTION

An embodiment of the present invention is described in greater detail with reference to the accompanying drawings wherein:

FIG. 1 is a cross-sectional view of the anti-corrosive sealing tape 1 of the present invention, which is made by laminating a first layer 1a having conductivity and a second layer 1b having waterproofing or thermal insulating properties. The first layer 1a consists of a rubber base, 5 to 350% by weight based on the rubber base of fine zinc powder, 2 to 10% by weight of magnesium oxide and 20 to 200% by weight of graphite powder having a surface area of 900 to 1100 m²/gr. The rubber base may comprise butyl rubber, ethylene-propylene rubber, natural rubber, acrylonitrile-butadiene rubber, styrene-butadiene rubber and chloroprene rubber. The rubber base is in the form of solid unvulcanized rubber and may be a blend of the heretofore mentioned rubbers. The rubber is blended to contain other additive conventionally present in rubber; e.g., vulcanization agents, etc. (The weight percentages of the magnesium oxide and the graphite is also based on the weight of the rubber base.) The second layer 1b consists of a single layer of a synthetic resin or rubber or a composite layer of such a single layer with a fibrous material. Examples of the synthetic resin includes polyvinyl chloride, polyethylene, urethane alkyd, polyurethane, phenolic resin; e.g., phenol-formaldehyde, urea-formaldehyde, a polypropylene, polyester and fluororesin; e.g., polytetrafluoroethylene.

A rubber base is used in the first layer to make the layer flexible so that the layer will allow for the expansion and contraction of pipes to be coated appropriately. Fine zinc powder (particle size of from 1 to 30 μm) is included in the first layer to protect a metal pipe or a structural member to be coated against corrosion since zinc would be preferably dissolved anodically when moisture condenses at the interface of the pipe or structural member and the coating layer, resulting in anodic polarization of the first layer as a whole and simultaneous cathodic polarization of said pipe or structural member. It is preferable to add the zinc powder in an amount of 5 to 350% by weight since a lessened effect is observed when it is added in an amount of below 5% by weight, while a remarkable degradation of the rubber is observed when it is added in an amount of above 350% by weight.

Magnesium oxide (particle size of from 1 to 30 μm) is added to impart hygroscopicity to the rubber base thereby effectively utilizing the fine zinc powder dispersed homogeneously in the rubber base. It is preferable to add the magnesium oxide in an amount of 2 to 10% by weight since a lessened effect is observed when it is added in an amount of below 2% by weight; while a remarkable degradation of the elasticity of the rubber is observed when it is added in an amount of above 10% by weight.

Graphite powder is further added to impart conductivity to the rubber base, which is necessary to anodically polarize the first layer and to cathodically polarize the pipes or structure member by dissolving the fine zinc powder dispersed homogeneously in the rubber base. Since, however, it imparts a corrosiveness to the rubber base when added in a large amount, it is preferable to minimize the amount of the graphite powder to be added. Furthermore, it is also preferable to minimize the particle size of the graphite powder. Thus, it is possible to impart a sufficient conductivity while inhibiting the corrosion by dispersing graphite powder having a surface area of 900 to 1100 m²/gr in an amount of 20 to 200% by weight. A poor conductivity is observed when it is added in an amount of below 20% by weight; while it imparts a corrosiveness when added in an amount of above 200% by weight. It is also preferable to add graphite powder having a surface area of 900 to 1100 m²/gr since an undesirably higher amount is necessary when the surface area is below 900 m²/gr; while graphite powder having a surface area of above 1100 m²/gr is undesirable from an economical viewpoint.

As described above, although the first layer 1a exhibits an anti-corrosive effect, its strength is not sufficient. Therefore, the second layer 1b is necessary to reinforce the first layer and to maintain the anti-corrosive effect for a long period. The composition of the second layer 1b may differ according to whether it is used only to reinforce the first layer 1a or whether it is used to impart waterproofing or thermal insulating properties to the first layer as well as to reinforce the first layer.

That is to say, when the second layer 1b is used only to reinforce and to waterproof the first layer 1a, the second layer should consist of a single layer of a synthetic resin such as polyvinyl chloride, polyethylene, urethane alkyd, polyurethane, polyester, polypropylene, phenolic resin, urea formaldehyde, fluororesin or rubber, or a composite layer of such a single layer with a fibrous material.

On the other hand, when the second layer is used to impart the thermal insulating properties to the first layer, the second layer should also comprise fibrous materials; e.g., fibers made of asbestos, silicon carbide, glass, carbon or boron.

Referring now to FIGS. 2 and 3, an experimental example will be described.

FIG. 2 shows a test piece prepared by externally coating a plain carbon steel (S35C) pipe 3 with a coating material 4 and fitted polypropylene sealing caps 5 at the both ends of the steel pipe. This test piece was allowed to stand in an experimental apparatus as shown in FIG. 3 for 8000 hours under a humidity of 100% and at a temperature of 80° C. to evaluate its anti-corrosive effect.

In FIGS. 3, 2a, 2b and 2c are test pieces placed within an experiment vessel 6 and having the same structure as the one shown in FIG. 2 except for the coating material. That is to say, the test piece 2a was coated with a polyvinyl chloride tape, the test piece 2b was coated with a styrene/butadiene rubber tape and the test piece 2c was coated with the anti-corrosive sealing tape 1 of the present invention (cf. FIG. 4). The anti-corrosive sealing tape 1 was prepared by laminating a first layer prepared by adding 300% by weight of fine zinc powder, 3% by weight of fine magnesium oxide powder and 35% by weight of graphite powder having an average surface area of approximately 1000 m²/gr to a butyl rubber base and the second layer consisting of polyvinyl chloride. Reference numeral 7 refers to an aqueous solution introduced into the experiment vessel 6 and numeral 8 is a heater provided in the solution 7.

After the completion of the experiment by using the aforementioned apparatus, the corrosion area of each test piece (2a to 2c) was measured to determine the anti-corrosion rate according to the following equation (1). As a result, little corrosion was observed in the test piece 2c coated with the anti-corrosive sealing tape of the present invention indicating a high anti-corrosion rate.

$$\text{Anti-corrosion rate} = \frac{S_0 - S_1}{S_0} \times 100 \tag{1}$$

where $S_0$ represents a surface area of a test piece before subjecting to the immersion test and $S_1$ represents the corroded surface area of the piece after the immersion test.

In addition, the anti-corrosive sealing tape of the present invention exhibits an excellent adhesiveness when wrapped around a pipe or a structural member and would be peeled from the member with difficulty, since the rubber base in the first layer contains vulcanizing agents in a small amount to give an incompletely crosslinked structure to thereby impart tackiness.

As described above, the present invention provides an anti-corrosive sealing tape which exhibits an anti-corrosive effect for a long period when wrapped around various pipes or structural members by a combined function of the first layer which exhibits an excellent anti-corrosive effect with a zinc component and the second layer which plays a role of reinforcing the first layer with imparting waterproofing or thermal insulating properties thereto.

FIG. 5 illustrates the manner in which the rubberj base is blended and formed into the first layer and then joined to the second layer to provide the sealing tape.

What is claimed is:

1. An anti-corrosive sealing tape which can protect metal pipes or structural members cathodically against corrosion when wrapped around them, which comprises a first layer containing a rubber base, 5 to 350% of fine zinc powder, 2 to 10% of magnesium oxide, and 20 to 200% of graphite powder based on the weight of the rubber base and a second layer for reinforcing the first layer and for imparting water-proofness to the sealing tape thereby maintaining the anti-corrosive effect for a long period.

2. An anti-corrosive sealing tape according to claim 1, wherein the graphite powder comprises electrostatically charged graphite powder.

3. An anti-corrosive sealing tape according to claim 1, wherein the second layer is comprised of polyvinyl chloride, polyethylene, urethane alkyd, polyurethane, phenolic resin, urea formaldehyde resin, polypropylene, polyester, fluororesin or a rubber.

4. An anti-corrosive sealing tape according to claim 3, wherein the second layer further comprises fibrous thermal insulation material selected from the group consisting of asbestos, silicon carbide, glass, carbon and boron in the form of a non-woven, woven, or knitted mat.

5. An anti-corrosive sealing tape according to claim 1, wherein said first layer has a thickness ranging from 0.5 mm to 3 mm and the second layer has a thickness ranging from 0.1 mm to 5 mm.

* * * * *